United States Patent Office 3,523,231
Patented Aug. 4, 1970

3,523,231
SERVOMECHANISM INCLUDING PULSE TRAIN COMMANDS, PULSE FEEDBACK FROM AN OPTICAL ENCODER, AND PHASE COMPARISON MEANS
Hugh MacDonald Arthur, John Young Condie Montgomery, and Donald Ferguson Walker, Edinburgh, Scotland, assignors to Ferranti, Limited, Hollingwood, Lancashire, England, a company of Great Britain and Northern Ireland
Filed Feb. 26, 1969, Ser. No. 802,569
Claims priority, application Great Britain, Mar. 2, 1968, 10,253/68
Int. Cl. G05b 19/24
U.S. Cl. 318—608　　　　　　　　　　　　　　4 Claims

ABSTRACT OF THE DISCLOSURE

Closed-loop servo apparatus for controlling the position of a machine tool in dependence on a train of irregularly-spaced command pulses representing elemental movements of constant length and one or other sense, in comparison with a measurement signal derived from an optical fringe counter system to represent the actual position of the tool. The command pulses are decoded into polyphase signals which are of triangular waveform when plotted against the command pulses. These are sampled repetitively and the combined samples are phase-compared with the measurement signal to derive the servo error signal for control of the tool.

---

This invention relates to pparatus for controlling the position of a movable object with respect to a reference structure in dependence on a train of command pulses representing increments of movement of the object of constant length and of one or other of opposite senses—that is, directions of movement. The senses may be defined by some characteristic of the pulses or by some additional signal.

The invention has particular application to machine tool control, where the object is the worktable or a cutter or other part of the tool. The invention will accordingly be described in that connection, but it should be understood that its application is not so limited.

An object of the invention is to provide apparatus for the purpose stated in the form of a closed-loop servo system for continuously controlling the position of the object as commanded by the pulse train in which the measurement of the actual position of the object is effected by a photoelectric system using ruled gratings.

In accordance with the invention, apparatus for controlling the position of an object with respect to a reference structure in dependence on a train of command pulses representing increments of movement of constant length and of one or other of opposite senses includes digital/analog conversion means for deriving from the train an effective cyclic command signal of $n$ phases, where $n$ is at least three, each phase having a wavelength defined by N successive command pulses of like sense and having a phase angle with respect to a complete cyclic which at any given moment represents the desired position of the object at that moment, optical fringe-counter measuring means for deriving cyclic measurement and reference signals of like frequency (which is high compared with the frequency of said cyclic command signal) so that the phase of the measurement signal relative to the phase of the reference signal represents the actual position of the tool, gating means, which may form part of said conversion means, for repetitively applying one of said cyclic signals to sample the effective command signal to derive from the phases of it a composite signal at said comparatively high frequency and of phase relative to the phase of said one cyclic signal which at any moment is dependent on the phase signals of the command signal at that moment, a comparator for phase comparing said composite signal with said other cyclic signal to derive an error signal of appropriate sense when their phases differ to a predetermined extent, and an actuator for applying the error signal to adjust the position of the object in the sense for nulling the error signal.

In the accompanying drawings.

The embodiment of FIG. 1 will now be described by way of example for use where the command train of pulses is received over a channel 10 from some source, such as magnetic tape or a computer, which is not shown. Each pulse of the train represents by its positive-going or negative-going sense a fixed increment of forward or backward movement, respectively, of the worktable 11 of a machine tool. The train is applied to digital/analog (D/A) conversion means 12 for deriving from the pulses a balanced four-phase cyclic command signal of symmetrical triangular waveform. Each phase has a wavelength defined by the arrival of a fixed number N of successive command pulses of like sense. For convenience, N will be taken to be 32, though it is usually somewhat greater. As the spaces between successive command pulses are variable, so also is the wavelength with respect to time of this four-phase analog signal derived from them.

Stage 12 includes a five-stage or 0–31 ring bidirectional binary counter 13 the respective stages S0 to S4 of which are connected to a decoder 14 in the form of a network of gates and weighted resistors which converts the binary digital signal from the counter into the four-phase command signal described Details of suitable equipment for stage 12 are described below.

Figure 1:
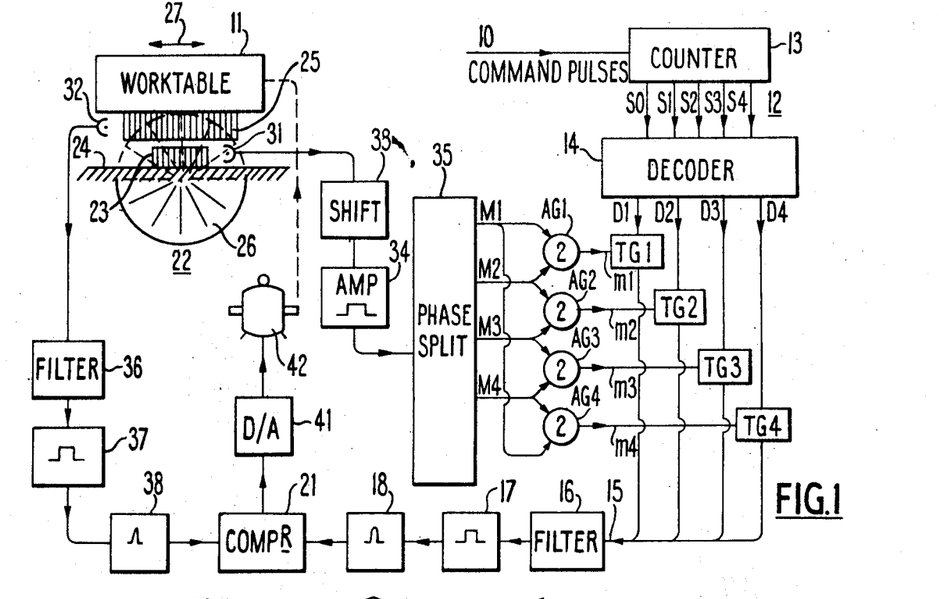
FIG. 1 is a schematic diagram mainly in block form of one embodiment of the invention.

The four phases D1 to D4 of the command signal are applied, over leads so labelled in FIG. 1, to gating means in the form of transmission gates TG1 to TG4. The outputs from these gates are commoned and connected by way of a lead 15 to a band-pass filter stage 16, followed by a squarer stage 17, and an edge-detector stage 18. The pulses derived by stage 18 are applied in the Add sense to a pulse phase comparator in the form of a ring bidirectional counter 21.

For deriving cycle measurement and reference signals to represent the actual position of the worktable, optical fringe-counter measuring means 22 are provided. These take the form of a reference grating 23 secured to a reference structure in the form of the tool framework 24, a main grating 25 secured to the worktable 11, and, common to both gratings, a rotary grating 26 arranged to be rotated at a constant speed by a motor which is not shown. Gratings 23 and 25 have lines ruled normal to the direction 27 of the table movement, whereas grating 26 has the lines ruled radially. The line spacings are depicted greatly exaggerated for clarity. The effect of this arrangement is that gratings 23 and 26 on the one hand, and 25 and 26 on the other, respectively set up reference and main alternating optical patterns the frequency of which, as determined by the speed of rotation of grating 26, is high compared with the frequency of the four-phase command signal at the fastest rate of arrival of the command pulses. The relative phase of these two optical patterns is dependent on the relative positions of gratings 25 and 23 and hence on the position of the worktable 11 relative to the tool frame 24.

The two optical patterns are sensed by reference and main photocells 31 and 32 which in response derive the cyclic measurement and reference signals above referred to. Thus the signal from photocell 32 takes the form of a carrier at the relatively high frequency determined by the speed of rotation of grating 26 and phase modulated in dependence on the actual position of the tool over one cycle of the pattern movement (whole cycles being ignored), whilst the signal from photocell 31 has the form of the same carrier modulated at a fixed phase.

The signal from cell 31 is applied to a phase-shift stage 33 to enable the reference phase to be adjusted. The output from this stage, after amplification and squaring in a stage 34, is applied to a phase-splitting stage 35 which produces from the squarewave input a balanced four-phase squarewave signal at the input frequency, applied over leads M1 to M4 to a gating system to be described.

The signal from cell 32 is applied to filter, squarer, and edge-detector stages 36, 37, and 38 similar to stages 16, 17, and 18 respectively, and the pulses derived by stage 38 are applied in a Substract sense to counter 21.

The output from counter 21, after conversion to analog form in a D/A stage 41, is applied as an error signal to an actuator 42 (shown as a motor) which drives the worktable 11.

The signals delivered over leads M1 to M4 are applied as the inputs to four two-entry And gates as follows: M1 and M2 to AG1; M2 and M3 to AG2; M3 and M4 to AG3; and M4 and M1 to AG4. The outputs from these gates are applied over leads m1 to m4 to control the transfer gates TG1 to TG4 respectively.

Figure 2:
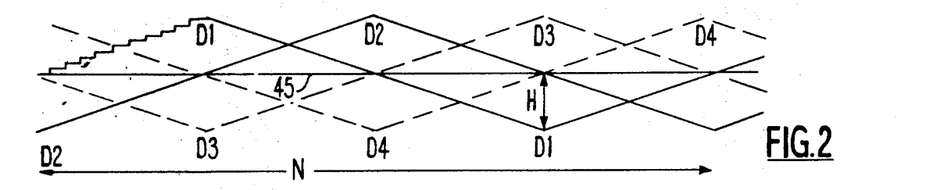
FIGS. 2 to 4 are waveform diagrams to illustrate the operation of the embodiment of FIG. 1.

In operation, the command signal waveforms D1 to D4 are as shown in FIG. 2. Each has an arbitrary amplitude H and is plotted against the command pulse input rather than against time. Each incoming positive command pulse expands each signal forward (to the right, as seen in the drawing) to the extent of 1/32 (more generally, 1/N) of the signal wavelength. Thus each wave is actually of stepped rather than straight-line form; but for clarity the stepped form is drawn for only the first quarter cycle of waveform D1. Any negative pulses cause the waveforms to contract leftwards.

The command pulses therefore cause the counter 13, from which decoder 14 derives the D signals, to vary stepwise forward or backward within a cycle defined by the counter's capacity, so that the commanded displacement at any given moment is represented by a fraction given by the number of pulses held in the counter at that moment divided by its capacity of 32 pulses.

Figure 3:
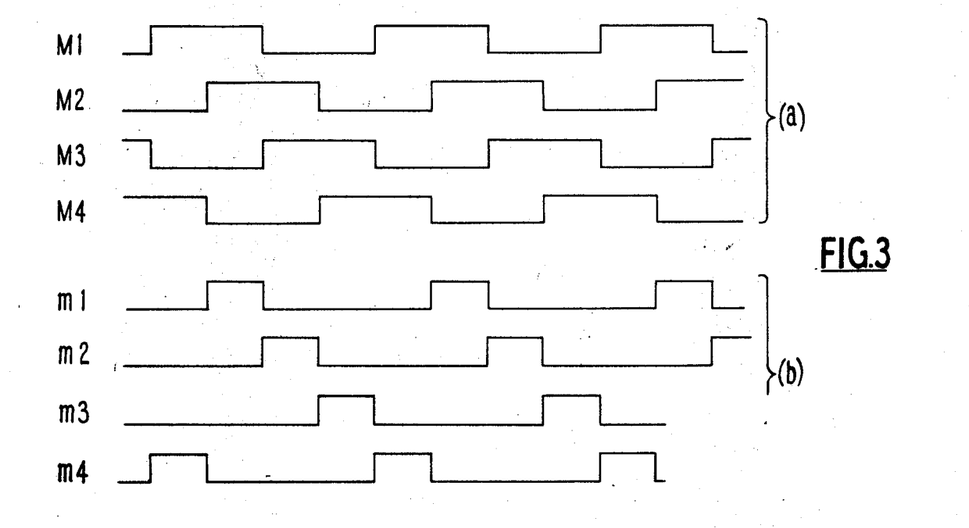

FIG. 3 shows at (a) the four signal waveforms M1 to M4. As the signal (from reference photocell 31) from which they are derived is at the comparatively high frequency compared with the command pulse input rate and hence with the frequency of the D signals, waveforms M are drawn to a correspondingly larger scale to render them clearly visible.

A FIG. 3(b) is shown the result of adding the pairs of M signals at the And gates AG. The resulting gate-controlling pulses m1 to m4 over the leads so labelled are so short compared with the D wavelengths that each D signal may be considered as constant—that is to say, no pulse arrives—during the interval in which the corresponding transfer gate TG is held open.

Figure 4:
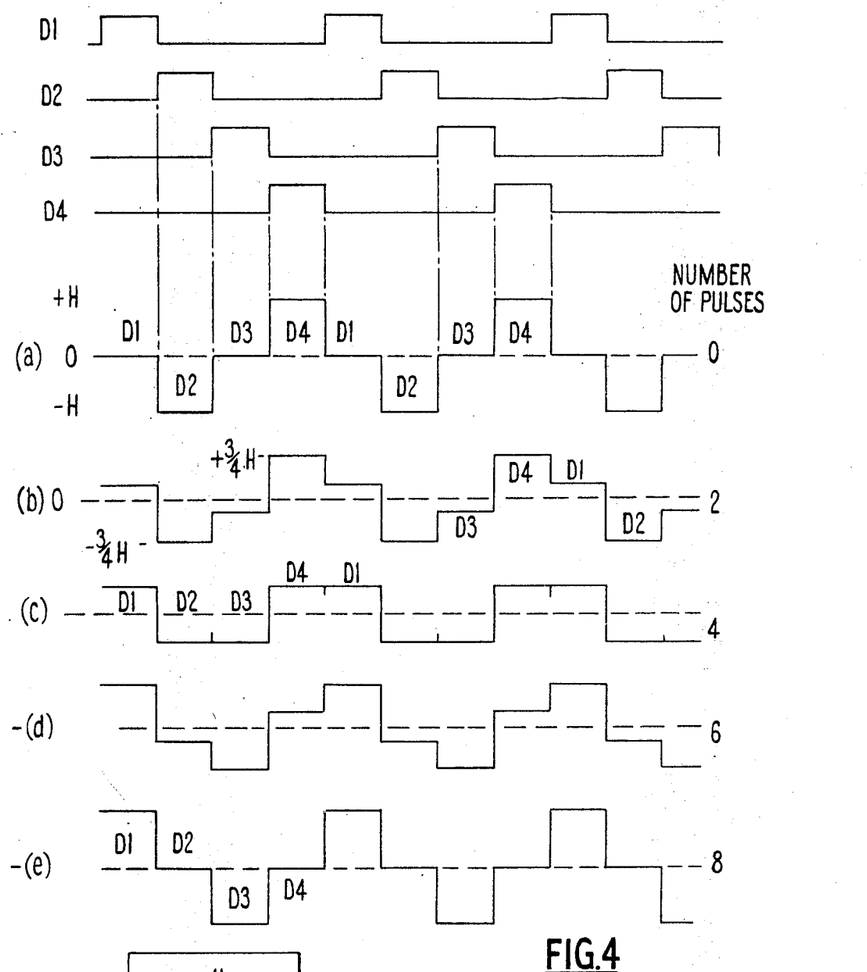

FIG. 4 shows the composite signal on lead 15 as the result of repetitively applying these gate-controlling pulses to the gating means to sample the command D signals. For convenience of reference, the gate-controlling pulses are reproduced from FIG. 3 but re-labelled D1 to D4 after the command signals they control at the transfer gates.

Starting at the left-hand end of the waveforms of FIG. 2, signals D1 and D3 are at zero, D2 at —H, and D4 at +H. Thus until the next pulse arrives the composite command signal on lead 15 has the waveform shown in FIG. 4(a).

After two command pulses of positive sense have arrived, the composite signal is as shown at (b). D1 has now the value $+H/4$, D2 is now $-3H/4$, D3 is $-H/4$, and D4 is $+3H/4$.

Another two pulses distort the waveform form (b) to (c), with D1 and D4 both $+H/2$ and D2 and D3 both $-H/2$.

Another two distort the waveform from (c) to (d); and another two—making 8 in all —from (d) to (e).

A quarter wavelength of the D waveform pattern of FIG. 2 has now been traversed. The remaining three-quarters return the composite pattern to the shape of FIG. 4(a).

The effect of a continuous stream of positive command pulses is thus to vary the HF waveforms at a comparatively slow rate from form (a) through forms (b), (c), (d), and so on, each waveform retaining its shape in the interval between the last pulse and the next. Any negative pulses cause a retrograde shift of the composite waveform—e.g. from (d) to (e) in response to two negative pulses.

From a study of FIG. 4 it will be seen that the effect of such a train of positive command pulses is to shift the composite waveform progressively in one direction—from left to right as seen in the drawing. This is especially noticeable if wave (e) is compared with wave (a). By filtering the composite waveform at stage 16 (to remove switching transients), squaring it at stage 17, and deriving a pulse from the leading edge of each resulting squarewave, a train of pulses is derived at the frequency of the M signals. The phase at any moment of these pulses with respect to the fixed phase of the reference pulses derived from photocell 31 is dependent on the respective phase angles at that moment of the command signal phases D1 to D4, which themselves are dependent on the proportion of pulses actually held in counter 13 to its full capacity. In other words, the pulse train of the composite signal is phase-modulated with respect to the reference signal in response to the command signal.

Hence any difference between the phases of the respective pulse train inputs to comparator 21 (or, more generally, any departure of them from a predetermined phase relationship) represents a difference between the actual and commanded position of the worktable. Such a difference involves a difference between the repetition frequencies of the pulses in the two trains; accordingly the error signal derived by counter 21 takes the form of an output pulse each time one train supplied two pulses in between two of the other train. This error signal, after conversion to analog form in stage 41, is applied to motor 42 to drive the table in the direction for nulling the error.

Figure 5:
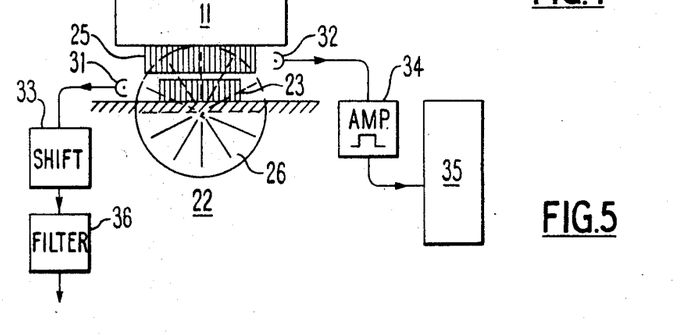
FIG. 5 shows an alternative arrangement for part of FIG. 1,
FIGS. 6 and 8 are circuit diagrams showing in detail parts of a stage shown generally in FIG. 1.

It is not essential for the M signals to be derived from the reference photocell 31; they may instead be derived from the main photocell 32, the output from which drives stage 35 by way of stage 34 as shown in FIG. 5. In this arrangement the fringe-counter input to stage 21 is provided by the reference cell 31, which is connected to the filter stage 36 by way of the phase adjuster stage 33. Thus the composite signal, which supplied the other input to stage 21, is modulated by the measurement signal as well as by the command signal. The arrangement nevertheless operates in a similar manner to that described with reference to FIG. 1.

Suitable equipment for converter 12 will now be briefly described with reference to FIGS. 6 and 7.

Counter 13, which is again assumed to count up to 32, from 0 to 31, is not shown, since various known forms of four-stage ring binary counter may be used provided that two outputs can be obtained from each stage to represent its On and Off conditions.

Figure 6:
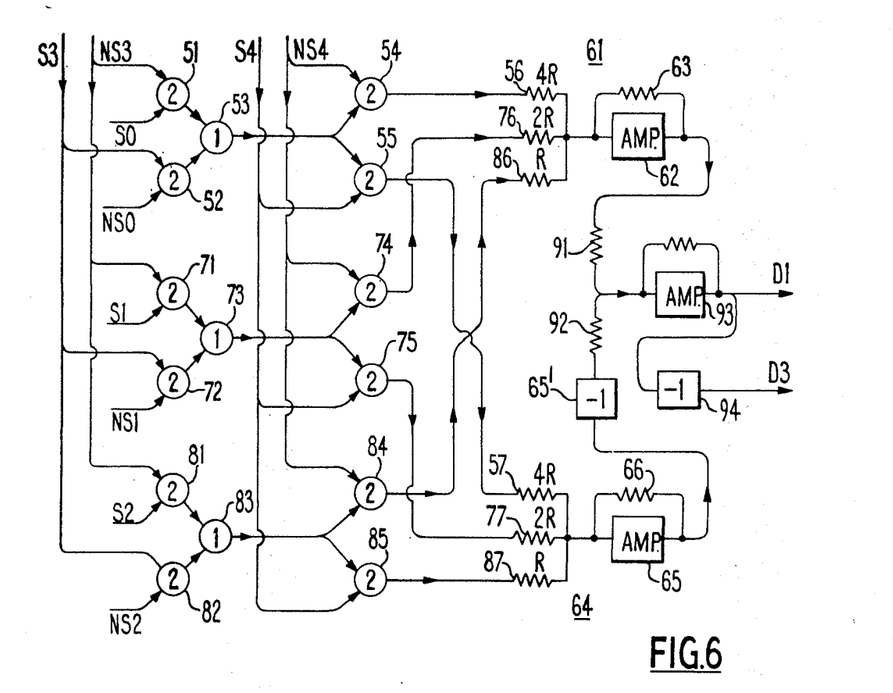

To generate the counterphase command signals D1 and D3, decoder 14 may include the network of gates and weighted resistors shown in FIG. 6. Reference will also be made to FIG. 7, which shows from S0 to S4 the response of the counter stages to a train of command pulses all of positive sense, together with the resulting waveforms D1 (full lines) and D3 (broken lines) as described above with reference to FIG. 2, using straight rather than stepped lines. For ease of reference the four quarter-cycles of wave D1 are labelled with the Roman numerals I, II, III, and IV (see FIG. 7).

In describing and depicting the network, the leads from the counter stages are designated S0 and NS0 (meaning "Not S0"), S1 and NS1, etc., depending on whether they are energised when the stage concerned is on or off. The more conventional system of indicating a "Not" state by a bar above the character is not used since it makes for difficulties in typing and errors in type setting.

As the slope of a wave is the same from quadrant to quadrant but only its sense varies and its location above or below the mean level 45 (see FIG. 7), only stages S0 to S2 of the counter are used to generate the wave, leaving stages S3 and S4 to control the sense and location.

Thus for deriving signal D1, the network includes for stage S0 of the counter a two-entry And gate 51 to the inputs of which are connected leads S0 and NS3; to another And gate 52 are connected leads NS0 and S3. The outputs from these gates are applied by way of an Or gate 53 as an input to each of two And gates 54 and 55, to the other inputs of which are connected leads NS4 and S4 respectively.

The output from gate 54 is applied to one of the weighted resistors 56, of value 4R ohms, of a positive decoder in the form of a standard analog adder stage 61, which includes the usual high-gain amplifier 62 and negative feedback resistor 63, for deriving the half of the D1 signal above the means level 45.

The output from gate 55, on the other hand, is applied to a 4R resistor 57 of a like decoder 64, which is responsible for the half cycle below level 45 and includes an amplifier 65, with feedback resistor 66, followed by a phase-inverting stage 65[1].

Components 71 to 77 for stage S1 of the counter correspond to components 51 to 57 for stage S0. Here however the second inputs to gates 71 and 72 are from leads S1 and NS1, and the weighted resistors 76 and 77 of the two decoders 61 and 64 have the value 2R.

Similarly components 81 to 87 are provided for stage S2, the weighted resistors having the value R.

The outputs from decoders 61 and 64 are connected by way of resistors 91 and 92 to another high-gain feedback amplifier 93 which delivers the D1 signal over the lead so labelled. As the signal D3 is merely a counterphase version of D1, it too is derived from amplifier 93, by way of a phase reversing stage 94.

In operation, during quadrant I, eight successive positive command pulses build D1 up to the +H level. Throughout this quadrant, the only leads of the two highest (most significant stages) energised are NS3 and NS4.

The first pulse P1 opens gate 51 and passes through gates 53 and 54 (as alerted by NS4) to resistor 56. All the other And gates have at least one input unalerted. At gate 52, for example, both leads S3 and NS0 are unenergised; at gate 71, NS3 is energised but S1 is not; and so on.

The next pulse P2 closes gate 51 but opens gate 71 and so replaces the 4R resistor 56 by the 2R resistor 76.

The third pulse P3 re-opens gate 51 and leaves gate 71 open, so that both resistors 56 and 76 are now in circuit.

The digital output from the counter is thus converted to analog form by the binary variations of the weighted resistors in circuit and the resulting outputs over the D1 line.

At the end of quadrant I, all three resistors 56, 76, and 86 are in circuit, and so representing the binary number 111 of pulses so far received.

For quadrant II, lead S3 is energised in place of NS3. Thus the effective inputs are the off-going signals NS0, NS1, and NS2, and the eight pulses of this quadrant switch them out in binary fashion to reach the mid-level 45 at the end of the quadrant.

For the excursions of wave D1 below the mid level, lead S4 is energised in place of NS4. This brings the analog adder stage 64 into use (by way of gates 55, 75, and 85) instead of stage 61. Leads NS3 and S3 are energised for quadrants III and IV respectively. The operation is otherwise much the same as before.

Thus the signal D1 is generated, and with it signal D3.

Equipment closely similar to that of FIG. 6 is provided for deriving signals D2 and D4. The main difference is as regards the control exercised by the counter stages S3 and S4, as follows.

As the parts of the D2 and D4 waveforms which slope away from the mid level occur in quadrants II and IV where lead S3 is energised, instead of in quadrants I and II (as with signal D1) where lead NS3 is energised, the leads S3 and NS3 from stage S3 of the counter to the gates corresponding to gates 51, 52, 71, 72, 81 and 82 of the arrangement of FIG. 6 are changed over.

Somewhat more complicated arrangements are needed to decide the location of the waves above or below the mid level 45. For whereas wave D1 is above the level whilst stage S4 is Off (quadrants I and II) and below it whilst stage S4 is On (quadrants III and IV), and so the required gate control need only be exercised over leads S4 and NS4, with waves D2 and D4 no such simple condition is present, and the aid of signals supplied over leads S3 and NS3 is also necessary.

Figure 7:
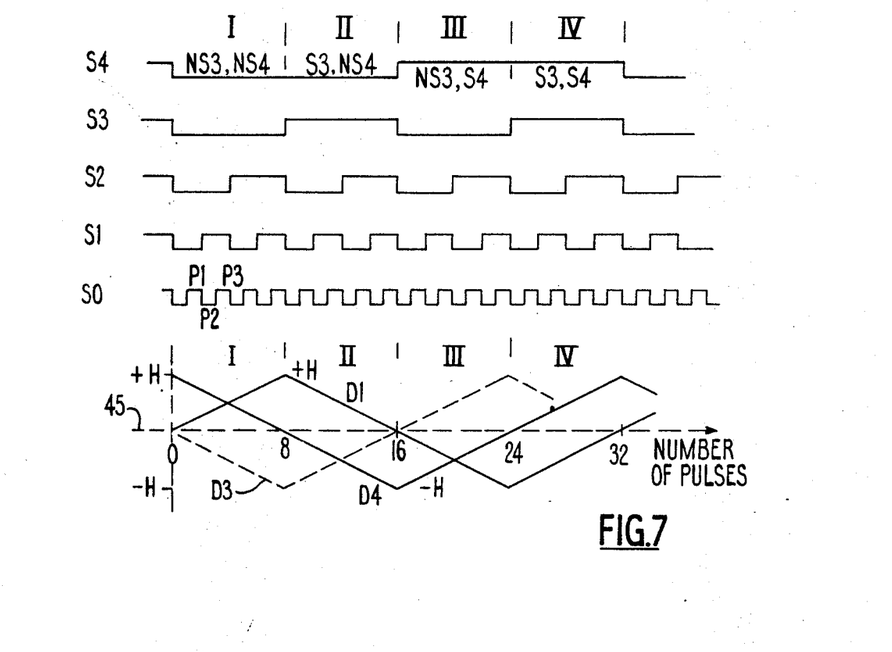
FIG. 7 is a waveform diagram to illustrate the operation of the circuit of FIG. 6.

FIG. 7 shows that wave D4 is above the mid level (a) in quadrant I, with both leads NS3 and NS5 energised, and (b) in quadrant IV, with both leads S3 and S4 energised. The gating network must therefore be arranged to derive signal D4 above mid level when either of those alternative conditions obtain.

Similarly with the parts of the wave below mid level: the gating network must provide the appropriate response when either (c) leads S3 and NS4 (quadrant II) or (d) NS3 and S4 (quadrant III) are both energised.

Having thus derived signal D4, signal D2 is derived from it by inversion.

Figure 8:
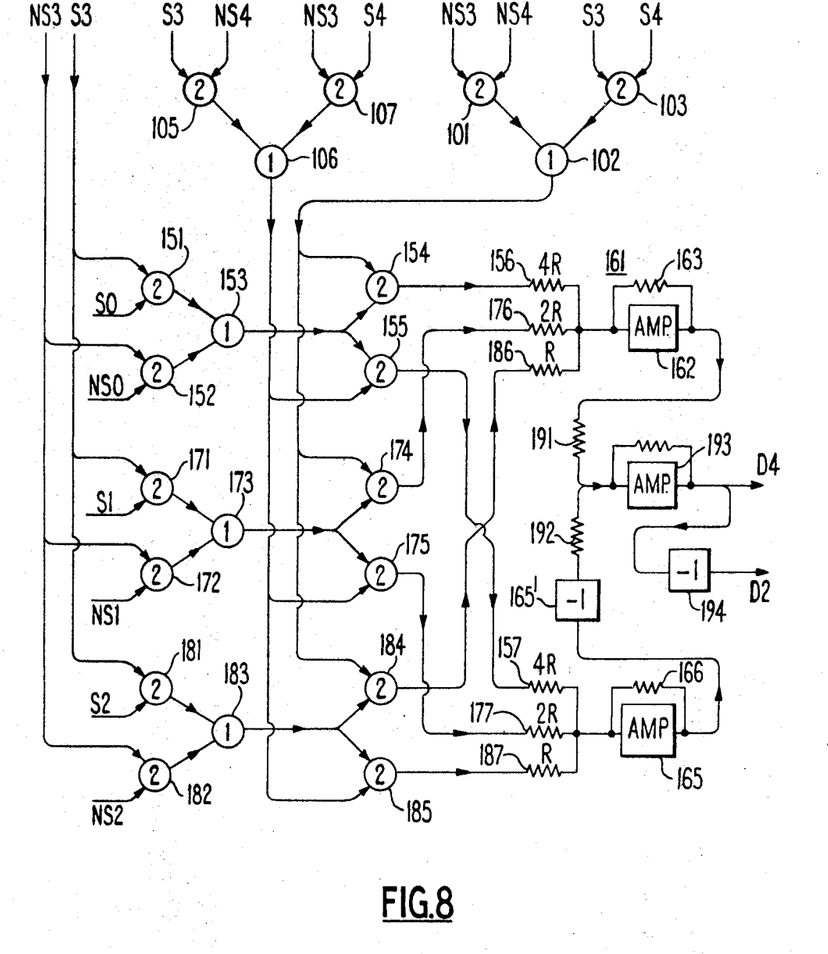

FIG. 8 shows the FIG. 6 network thus modified, a hundred being added to the reference number of each component that corresponds to one already described.

In FIG. 6 the location-controlling input to gate 54 is from lead NS4; in the present arrangement the corresponding input to gate 154 is either from both leads NS3 and NS4 by way of an And gate 101 and Or gate 102, or from both leads S3 and S4 by way of an And gate 103 and Or gate 102.

Similarly, in place of the input from lead S4 to gate 55, gate 155 has inputs either from both leads S3 and NS4, by way of And gate 105 and Or gate 106, or from both leads NS3 and S4 by way of And gate 107 and Or gate 106.

As already mentioned, leads S3 and NS3 to the gates equivalent to gates 51, 52, etc., now 151, 152, etc., are changed over from their positions in FIG. 6.

The operation of this arrangement is otherwise as before, with signal D2 derived from D4 by a phase inverter 194.

The phase adjuster stage 33 (FIG. 1) may take various forms. A convenient arrangement (not shown) is to connect photocell 31 to stages corresponding to stages 36 and 37 provided for the measurement signal. The resulting four-phase output is applied to four equally-spaced input points of a circular potentiometer and the output (to stage 36) is derived from a radial wiper the angular adjustment of which provides the required shift of the fixed phase. Alternatively, the potentiometer may be energised by two photocells at quadrature spacings of the optical pattern (in place of the one cell 31) with the output of each applied to diametrically opposite points of the potentiometer by way of a phase splitting stage.

An alternative form of the D/A converter means, which in this arrangement incorporates the gating means, will now be described with reference to FIGS. 9 and 10.

The arrangement has the advantage over that of FIGS. 6, 7, and 8 of requiring somewhat fewer components. It differs from the previous arrangement in two main respects. First, the cyclic command signal of phases D1 to D4 (FIG. 2), whilst still being generated effectively, are no longer generated continuously but only intermittently, each being present only during the presence of a switching pulse of the corresponding signal received from the AG gates (FIG. 1) over the appropriate one of leads $m1$ to $m4$. This should become clearer from the description below of the operation.

Figure 10:
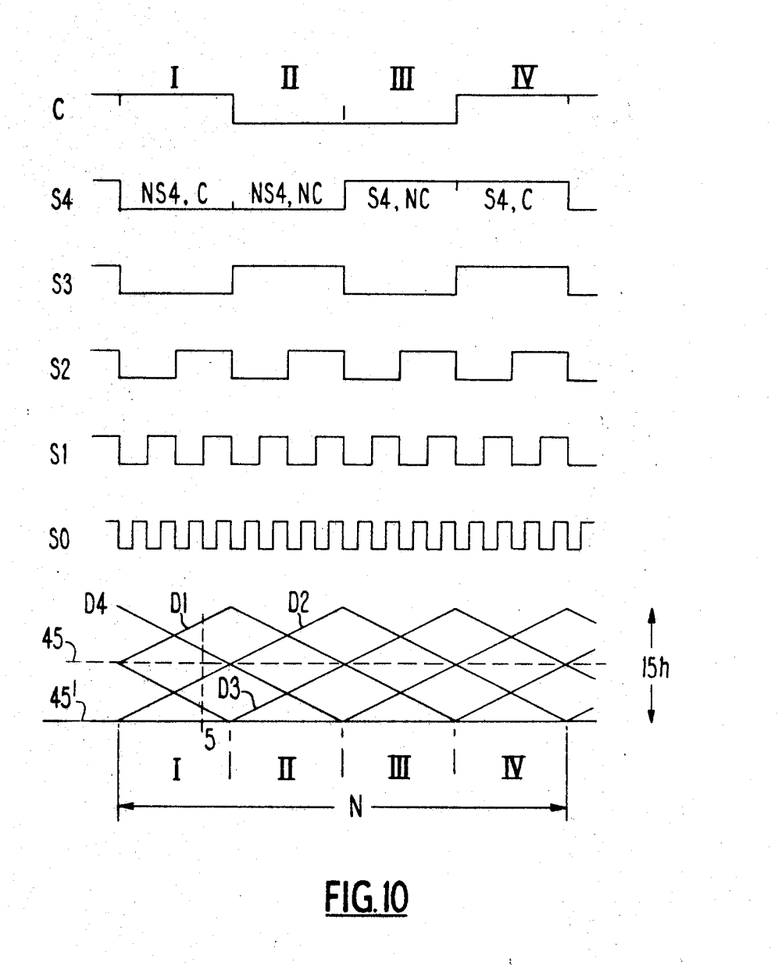
FIG. 10 shows waveforms to illustrate the operation of the embodiment of FIG. 9.

Second, phases D1 and D4 are defined in half-cycles, rather than quarter-cycles, with the original mean level 45 (FIG. 2) dropped to provide the starting level $45^1$ (see FIG. 10). To supply the sixteen pulses for each half cycle, stage S3 has to be diverted from its previous role of assisting stage S4 to control the wave locations and instead assist stages S0 to S2 to generate them, stage S4 being now assisted by a new control waveform C.

Figure 9:
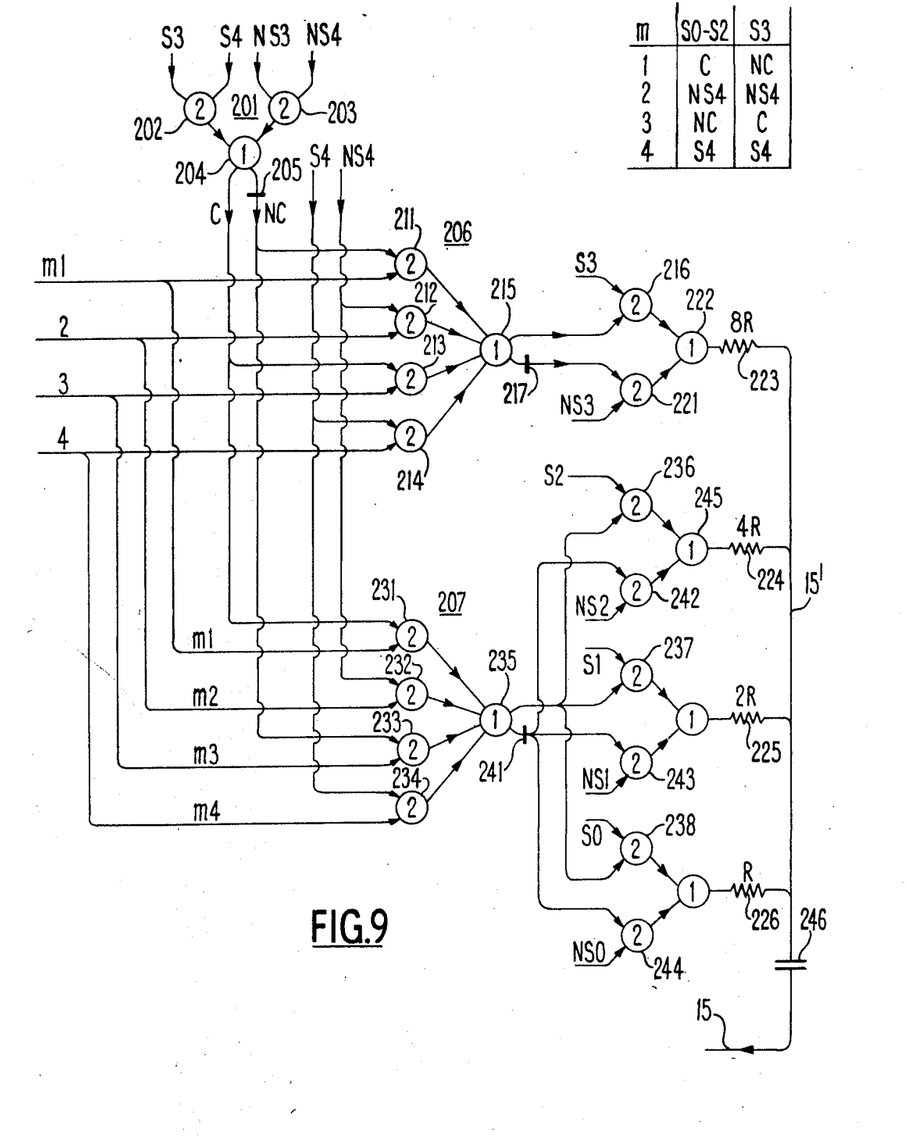
FIG. 9 is a diagram showing an alternative embodiment to that of FIG. 6.

Turning now to FIG. 9 in which each of the many And gates is of the two-entry kind unless otherwise stated, control signal C is derived in a sub-network 201. This includes two And gates 202, having leads S3 and S4 as inputs, and 203, with inputs NS3 and NS4. The outputs from gates 202 and 203 are commoned at an Or gate 204. One of its outputs is the signal C, over a lead so designated; a second output is applied by way of a negater stage 205 to a lead NC ("not C"). Those two leads together with leads S4 and NS4 and $m1$ and $m4$ are applied to a first array 206 of four And gates controlling the outputs from stage S3, and a second array 207 of such gates controlling the outputs from stages S0 to S2.

Array 206 includes gates 211 to 214 to one of the entries of which are connected leads $m1$ to $m4$ respectively. To the other entries are connected leads NC, NS4, C, and S4 respectively. The outputs from these gates are applied by way of an Or gate 215 as one input to an And gate 216 having signal S3 as the other input; another output from gate 215 is applied by way of a negater 217 as one input to an And gate 221 having signal NS3 as the other. The outputs from gates 216 and 221 are applied by way of an Or gate 222 and a resistor 223 of 8R ohms resistance to a common output lead $15^1$.

Resistor 223 together with resistors 224 to 226, of 4R, 2R, and R ohms resistance respectively, form an array of weighted resistors corresponding to the two groups 56, 76, 86, and 57, 77, 87, of resistors of the arrangement of FIG. 6, the present resistor 223 of 8R ohms, under the control of counter stage S3, being added to allow each D waveform to be defined in sixteen-pulse half-cycles as above explained.

Array 207 includes gates 231 to 234 to one of the entries of which are connected leads $m1$ to $m4$ respectively and to the other entries leads C, NS4, NC, and S4 respectively. Their outputs are applied by way of an Or gate 235 as one input to each of three And gates 236 to 238 having as the other inputs signals S3, S1 and S0 respectively. Another output from gate 235 is applied by way of a negater 241 as an input to each of three further And gates 242 to 244 having signals NS2 to NS0 as the other inputs.

The outputs from gates 236 and 242 are connected by way of an Or gate 245 and resistor 224 (4R ohms) to lead $15^1$. Gates 237 and 243 are similarly connected to lead $15^1$ by way of resistor 225 (2R ohms), and gates 238 and 244 to lead $15^1$ by way of resistor 226, of R ohms. Lead $15^1$ is connected by way of a capacitor 246 to lead 15 (FIG. 1) and hence to stage 16.

The network of FIG. 9 operates broadly as follows. For each of the 32 numbers from 0 to 31 represented by a particular condition of stages S0 to S4 of the counter 13, the network effectively generates the four D signals by setting up four overlapping patterns of alerted gates. There is one pattern for each D signal, and its alerted gates lead to that combination of weighted resistors 223 to 226 which represents the value of that particular D signal when the counter holds that particular number.

Each $m$ signal, on arrival at the network, samples the corresponding D signal by completing the current path through the corresponding pattern of alerted gates to the corresponding combination of weighted resistors. The repetitive cyclic sampling of the D signals by the $m$ signals results in a composite output signal of the kind shown in FIG. 4 but with the lowest level zero rather than $-H$. The composite signal is thus an alternating (A.C.) signal as before, but this time with a D.C. component, which capacitor 246 is provided to suppress.

The operation of the network will now be described with reference to FIG. 10, which shows the D waveforms of FIG. 2 redrawn to start from the new base line $45^1$. Although—taking wave D2 as an example—the wave excursion from 0 back to 0 over the full 32 pulse range of the counter resembles only a half cycle, it is in fact a complete cycle performed from one extreme limit of its excursion—base line $45^1$—to the other, rather than about a mean level 45 (here shown in broken lines) as in FIG. 2.

Above the S4 waveform is shown the C waveform generated by sub-network 201 of FIG. 9.

Although the switching is now by half-cycles rather than quadrants, the previous quadrant references I to IV (FIG. 7) have been inserted; they are now defined by signals C and S4, rather than by S4 and S3 as in the previous arrangement.

The operation is sufficiently similar to that of the network of FIG. 6 to need little more than a single numerical example to illustrate the two main differences above mentioned. It will be assumed for this example that the counter holds the decimal number 5 (binary 00101) as represented by the energisation of stages S0 and S2 only. Thus the respective energised leads from the counter are S0, NS1, S2, NS3, and NS4. The number 5 is in quadrant I, where its approximate position is indicated. In this quadrant, lead C is energised but not lead NC.

It will be assumed that each pulse on arriving at counter 13 displaces each D waveform by the incremental vertical amount $h$, up or down, by energising or de-energising a resistance of value R ohms. Thus the maximum height above the $45^1$ level is $15h$, represented by the sum of all four weighted resistors 223 to 226.

Signal $m1$, arriving at gating array 206, finds gate 211 unalerted by signal NC. As there are no other $m$ signals at the moment, all inputs to gate 215 are in the "Not" state. The gate accordingly passes an output through negater 217, which, finding gate 221 alerted by signal NS3, passes through to gate 222 to energise resistor 223.

In array 207, signal $m1$ finds gate 231 alerted by the signal C, and so passes through gates 231 and 235 to one input of each of gates 236, 237, and 238. There it finds only gates 236 and 238 alerted (by signals S2 and S0); hence resistors 224 and 226 are energised. Thus the height of the D1 wave is given as $8R+4R+R-13R=13h$.

Signal $m2$ finds gate 212 alerted by signal NS4 and so reaches gate 216, to find it unalerted. Thus resistor 223 is unenergised. Gate 232 of array 207 is also alerted, with the result that the signal energises resistors 224 and 226 by way of gate 236 and 238 respectively. The height of the D2 waveform is thus 4R+R, or 5h.

Signal m3 similarly fails to reach resistor 223. In array 207 it finds gate 233 unalerted. Thus the output from gate 235 is by way of negater 241 to one input each of gates 242, 243, and 244. Of these, only gate 243 is alerted—by signal NS1. The height of the waveform is thus 2h.

Signal m4 is blocked by gate 214, so that resistor 223 is energised from negater 217 and gate 221. In array 207, gate 234 blocks the signals, so that only resistor 225 is energised, as in the case of signal m3. The height is thus 8R+2R or 10h.

Thus when the counter holds 5 pulses, the respective patterns of alerted gates leading to the weighted resistors are:

D1: gates 221, 231, 236, and 238; to resistors 223, 224, and 226.
D2: gates 232, 236, and 238; to resistors 224 and 226.
D3: gate 243; to resistor 225.
D4: gates 221 and 243; to resistors 223 and 225.

It will be seen that these overlap, to the extent that certain gates and resistors are shared between two or more patterns.

An important point to notice is how waves D1 and D4, which in quadrant I requires the 8R ohm resistor, have it included in their circuits despite the fact that in that quadrant signal S3 is in its Not state. This is achieved— as just described—by the negated output from Or gate 215 to AND gate 221, alerted by the signal NS3.

Similarly the negated output from Or gate 235 allows resistors 224 to 226 to be switched in despite the Not condition of the corresponding stages S2 to S0.

It will be observed that gates 212 and 232 have identical inputs: signals m2 and NS4. Thus one of these gates could be omitted and the necessary signal to the associated Or gate supplied by the other. Similarly one of gates 214 and 234 is redundant. All four of these gates are nevertheless shown in the drawing, as it is thought that this makes the network easier to follow.

What we claim is:
1. Apparatus for controlling the position of an object with respect to a reference structure in dependence on a train of command pulses representing increments of movement of constant length and of one or other of opposite senses including
  (a) digital/analog conversion means for deriving from the train an effective cyclic command signal of $n$ phases, where $n$ is at least three, each phase having a wavelength defined by N successive command pulses of like sense and having a phase angle with respect to a complete cyclic which at any given moment represents the desired position of the object at that moment,
  (b) optical fringe-counter measuring means for deriving cyclic measurement and reference signals of like frequency (which is high compared with the frequency of said cyclic command signal) so that the phase of the measurement signal relative to the phase of the reference signal represents the actual position of the tool,
  (c) gating means, which may form part of said conversion means, for repetitively applying one of said cyclic signals to sample the effective command signal to derive from the phases of it a composite signal at said comparatively high frequency and of phase relative to the phase of said one cyclic signal which at any moment is dependent on the phase angles of the command signal at that moment,
  (d) a comparator for phase comparing said composite signal with said other cyclic signal to derive an error signal of appropriate sense when their phases differ to a predetermined extent, and
  (e) an actuator for applying the error signal to adjust the position of the object in the sense for nulling the error signal.

2. Apparatus as claimed in claim 1 wherein the conversion means includes a 0 to $(N-1)$ ring binary counter the On and Off outputs of the respective stages of which are applied to a decoder in the form of a network of gating stages and weighted resistors for converting each binary signal from the counter into the $n$ phases of the command signal.

3. Apparatus as claimed in claim 2 wherein the gating means includes a phase-splitting stage arranged to be energised by said one cyclic signal to produce therefrom a balanced $n$-phase squarewave signal at said comparatively high frequency, $n$ transfer gates one in each phase of the command signal, gate-controlling connections from said $n$ phase squarewave signal to said gates, and a common output lead from the gates to carry said composite signal.

4. Apparatus as claimed in claim 1 wherein the conversion means includes said gating means, the two together including a logical network of gates and weighted resistors, connections to the gates of the network from the counter to ensure that for each number held in the counter the respective phases of the command signal are represented by patterns of alerted gates leading to the appropriate combinations of said resistors, and connections to the gates of the network from said measuring means to ensure that said one cyclic signal samples each command signal by completing a current path through the appropriate combinations of said gates and resistors.

References Cited
UNITED STATES PATENTS 3,098,186  7/1963  Williamson et al.
3,122,686  2/1964  Davies et al.
3,320,501  5/1967  Davies.
3,396,320  8/1968  Good.

THOMAS E. LYNCH, Primary Examiner

U.S. Cl. X.R.
318—28, 30